(12) United States Patent
Kim et al.

(10) Patent No.: US 12,258,069 B2
(45) Date of Patent: Mar. 25, 2025

(54) BODY FOR VEHICLE

(71) Applicants: Hyundai Motor Company, Seoul (KR); Kia Corporation, Seoul (KR)

(72) Inventors: Do Hoi Kim, Sejong-si (KR); Sang Sun Park, Anyang-si (KR); Ju Chul Kim, Ulsan (KR); Sung Tai Jang, Ulsan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 279 days.

(21) Appl. No.: 17/933,159

(22) Filed: Sep. 19, 2022

(65) Prior Publication Data

US 2023/0080893 A1 Mar. 16, 2023

(30) Foreign Application Priority Data

Nov. 9, 2021 (KR) .................. 10-2021-0152945

(51) Int. Cl.
*B62D 25/06* (2006.01)
*B60R 13/04* (2006.01)
*B62D 25/04* (2006.01)
*B62D 27/00* (2006.01)
*B62D 27/02* (2006.01)
*B62D 29/00* (2006.01)
*B60J 10/70* (2016.01)

(52) U.S. Cl.
CPC .............. *B62D 25/06* (2013.01); *B60R 13/04* (2013.01); *B62D 25/04* (2013.01); *B62D 27/00* (2013.01); *B62D 27/023* (2013.01); *B62D 29/001* (2013.01); *B62D 29/004* (2013.01); *B62D 29/008* (2013.01); *B60J 10/70* (2016.02)

(58) Field of Classification Search
CPC ........ B62D 25/04; B62D 25/06; B62D 25/02; B62D 27/00; B62D 27/023; B62D 29/004; B62D 29/005
USPC .... 296/210, 23.01, 3, 191, 205, 209, 193.05
See application file for complete search history.

(56) References Cited

U.S. PATENT DOCUMENTS

| 4,355,843 | A | 10/1982 | Murakami |
| 6,322,135 | B1 | 11/2001 | Okana et al. |
| 7,758,109 | B2 * | 7/2010 | Reed ............ B62D 25/06 296/210 |
| 9,868,465 | B2 | 1/2018 | Kurokawa |

(Continued)

FOREIGN PATENT DOCUMENTS

| DE | 10247045 B4 * | 5/2006 | ............ B62D 25/02 |
| DE | 10121377 B4 * | 6/2015 | ............ B62D 25/04 |

(Continued)

OTHER PUBLICATIONS

DE10120377 Text (Year: 2015).*
DE10247045 Text (Year: 2006).*
JP2004082861 Text (Year: 2004).*

*Primary Examiner* — Dennis H Pedder
(74) *Attorney, Agent, or Firm* — Slater Matsil, LLP

(57) ABSTRACT

An embodiment vehicle body includes a tubular part extended in a longitudinal direction of a vehicle and having a hollow shape, a base part in which the tubular part is inserted, the base part integrally connecting an A pillar to a side portion of a roof, and an outer garnish shaped to be extended in the longitudinal direction along the base part and coupled to the base part to cover the base part.

20 Claims, 14 Drawing Sheets

(56) References Cited

U.S. PATENT DOCUMENTS

| | | | |
|---|---|---|---|
| 2005/0258626 A1* | 11/2005 | Hill | B60R 21/055 |
| | | | 280/756 |
| 2015/0251708 A1 | 9/2015 | Kim et al. | |
| 2016/0121936 A1 | 5/2016 | Patberg et al. | |
| 2016/0332674 A1 | 11/2016 | Okuyama et al. | |

FOREIGN PATENT DOCUMENTS

| | | | |
|---|---|---|---|
| JP | 2004082861 A * | 3/2004 | |
| JP | 4468561 B2 | 5/2010 | |
| JP | 2016068708 A | 5/2016 | |
| KR | 20000053613 A | 8/2000 | |
| KR | 20150104269 A | 9/2015 | |
| KR | 20160020431 A | 2/2016 | |

* cited by examiner

BODY FOR VEHICLE

CROSS-REFERENCE TO RELATED APPLICATIONS

The present application claims the benefit of Korean Patent Application No. 10-2021-0152945, filed on Nov. 9, 2021, which application is hereby incorporated herein by reference.

TECHNICAL FIELD

The present invention relates generally to a body for a vehicle.

BACKGROUND

In a conventional steel body-in-white (BiW) upper body frame, openings of a roof, a side part, a windshield, and a lid part have individual sections, and the opening member is partially formed as an open section. In other words, the conventional vehicle body has a structure in which an A pillar and an end of a roof side member are disconnected and the disconnected end is connected to another member.

It is difficult to secure body rigidity, ceiling rigidity, and durability performance because of the opening and the open section of the upper body component, and in forming a closed section structure, an increase in the number of components for assembly and connection of the vehicle body and an assembly problem occur.

Therefore, in the conventional disconnected structure of connecting members to each other, there is a problem in that it is difficult to secure the strength to maintain occupant space as much as possible in an event of collision or rollover.

The foregoing is intended merely to aid in the understanding of the background of the present invention, and is not intended to mean that the present invention falls within the purview of the related art that is already known to those skilled in the art.

SUMMARY

The present invention relates generally to a body for a vehicle. Particular embodiments relate generally to a technique of applying a body for a vehicle to various types of vehicles sharing a lower body including a front portion, a rear portion, and a lower portion of the body for a vehicle such that the front portion, the rear portion, and the lower portion of the body for a vehicle are integrally manufactured and an upper body is then manufactured to be coupled to the lower body.

Accordingly, embodiments of the present invention have been made keeping in mind problems occurring in the related art, and embodiments of the present invention provide a body for a vehicle, the body for a vehicle being configured such that a front portion, a rear portion and a lower portion of the body for a vehicle are integrally manufactured and a separate portion from an A pillar toward a side surface of a roof is manufactured and coupled thereto so as to be applied to various types of vehicles sharing the front portion, the rear portion, and the lower portion.

According to one embodiment of the present invention, there is provided a body for a vehicle, the body including a tubular part extended in a longitudinal direction of a vehicle and having a hollow shape, a base part in which the tubular part may be inserted and integrally connecting an A pillar to a side portion of a roof, and an outer garnish shaped to be extended in the longitudinal direction along the base part, and coupled to the base part to cover the base part.

The body for a vehicle may include a base frame made of a metal material and including a front portion, a rear portion, and a lower portion of the body of a vehicle, the lower portion connecting the front portion to the rear portion, wherein a front end of the base part may be connected to the front portion of the base frame and a rear end of the base part may be connected to the rear portion of the base frame.

The body for a vehicle may include an inner bracket coupled to an inner portion of the base part and connecting the base part to the front portion and an outer bracket coupled to an outer portion of the base part and connecting both the base part and the tubular part to the front portion.

The inner bracket may be coupled to an outer portion of an inner plate of the front portion and the outer bracket may be coupled to both the inner bracket and an inner portion of an outer plate of the front portion.

The inner bracket may be coupled to an inner portion of an inner plate of the front portion and the outer bracket may be coupled to an inner portion of an outer plate of the front portion.

The rear portion of the base frame may include a C pillar extended toward the roof, and the lower portion of the base frame may include a B pillar extended toward the roof, and the rear end of the base part may be connected to the C pillar and a middle portion of the base part may be connected to the B pillar.

An end of the B pillar may be shaped to be inclined inward from the vehicle and connected to both the base part and a B pillar connection portion.

The body for a vehicle may include a C pillar bracket connecting the base part to the C pillar, wherein the base part may be coupled to the C pillar bracket to be connected to an outer plate of the C pillar, and the outer garnish may be connected to a lower end of the outer plate of the C pillar.

The base part may be coupled to the base frame by mechanical coupling during connection.

An inner portion of the base part may be shaped in a rib.

The rib of the base part may have an X-crossed shape and be arranged inside the base part.

Alternatively or additionally, the rib of the base part may have a shape of "H", "T", or "-".

The rib of the base part may include a central rib extended in an extended direction of the tubular part and an auxiliary rib extended in a crossed direction to the central rib.

Pairs of base parts, tubular parts, and outer garnishes may be provided at transversal opposite portions of the vehicle, and the body for a vehicle further may include a roof member extended from each of the base parts toward the roof.

Each of the base parts may include a roof connection portion extended toward the roof and connecting the base part to the roof member, and the body for a vehicle may include a roof bracket connecting the roof connection portion to the roof member.

The tubular part may be formed by extrusion molding using a steel material, and the base part may be made of a synthetic resin material and formed by injection molding after the tubular part is inserted into the base part.

The base part may have a flange portion at an outer portion thereof, the flange portion being extended in the longitudinal direction and protruding outward and coupled to a weatherstrip or a sash including a window of the vehicle.

The outer garnish may constitute an exterior of the vehicle and is made of a plastic material.

According to embodiments of the present invention, the front portion, the rear portion, and the lower portion of the body for a vehicle are integrally manufactured, and a portion from the A pillar to the roof side surface is coupled to the front portion, the rear portion, and the lower portion while the tubular part with a closed section is inserted into and coupled to the base part. Therefore, the portion from the A pillar to the roof side surface is not disconnected and is formed in a continuously extended shape, so that the rigidity of the upper body of the vehicle can be improved.

Furthermore, as the base part and the tubular part are manufactured in various shapes, the front portion, the rear portion, and the lower portion can be shared in various types of vehicles and the upper body of a vehicle can be variously applied to vehicles with different shapes, so that the manufacturing cost can be reduced.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF ILLUSTRATIVE EMBODIMENTS

Figure 1:
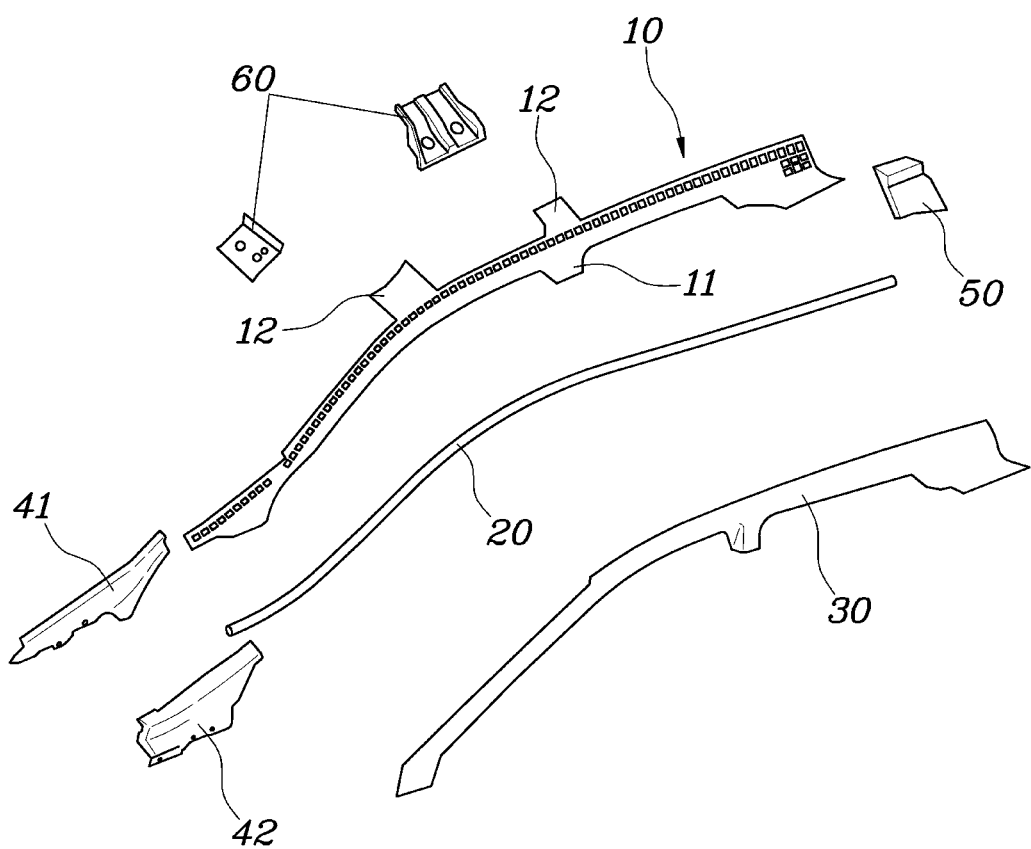
FIG. 1 is an exploded-perspective view showing a base part, a tubular part, and an outer garnish of a body for a vehicle according to an embodiment of the present invention.

In the following description, the structural or functional description specified to an exemplary embodiment according to the concept of the present invention is intended to describe the exemplary embodiment, so it should be understood that the present invention may be variously embodied, without being limited to the exemplary embodiment.

An embodiment described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing a particular embodiment only and is not intended to limit the present invention. Singular forms are intended to include plural forms unless the context clearly indicates otherwise. It will be further understood that the terms "comprises" or "have" used in this specification specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, an exemplary embodiment will be described in detail with reference to the accompanying drawings. Like reference numerals given in the drawings indicate like components.

Figure 2:
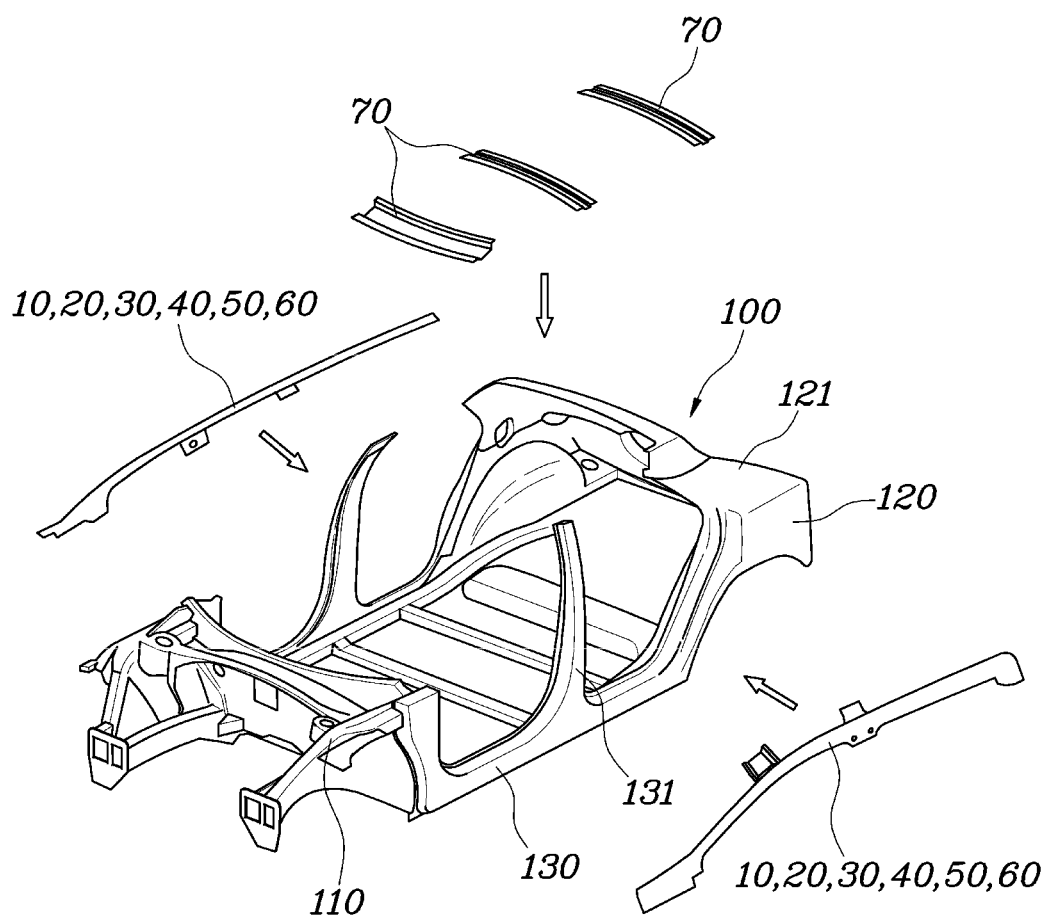
FIGS. 2 and 3 are perspective views showing a coupling embodiment of the body for a vehicle according to an embodiment of the present invention.
Figure 3:
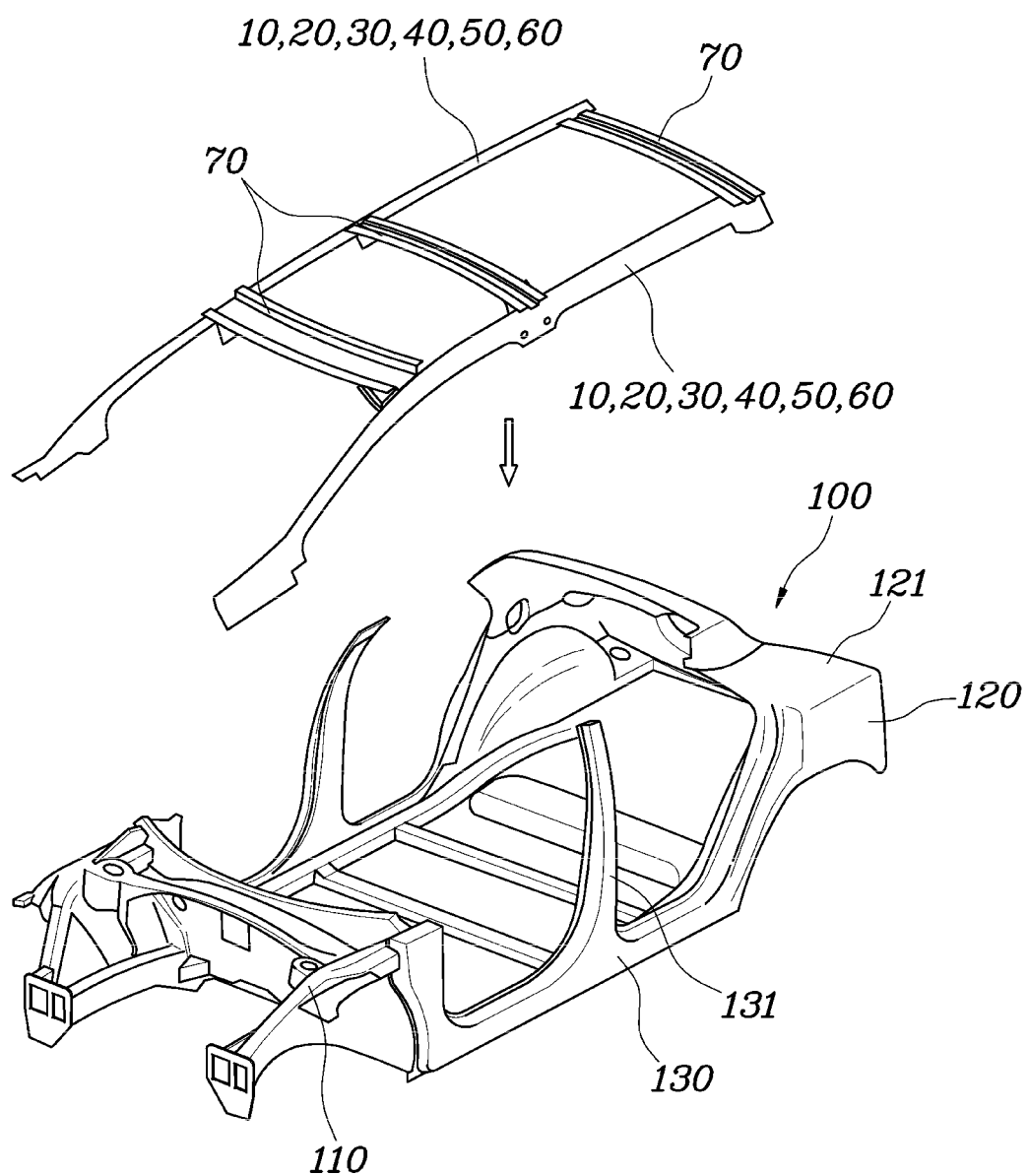
Figure 4:
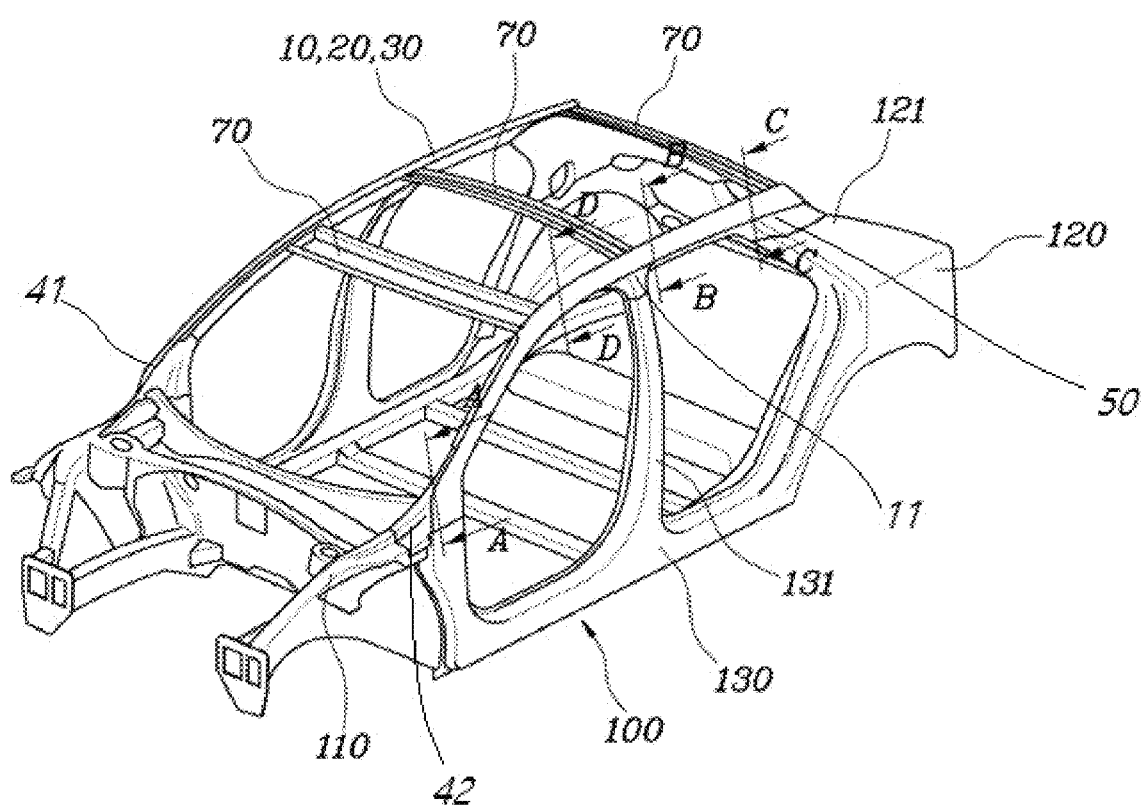
FIG. 4 is a view showing a complete assembly of the body for a vehicle according to an embodiment of the present invention.
Figure 5A:
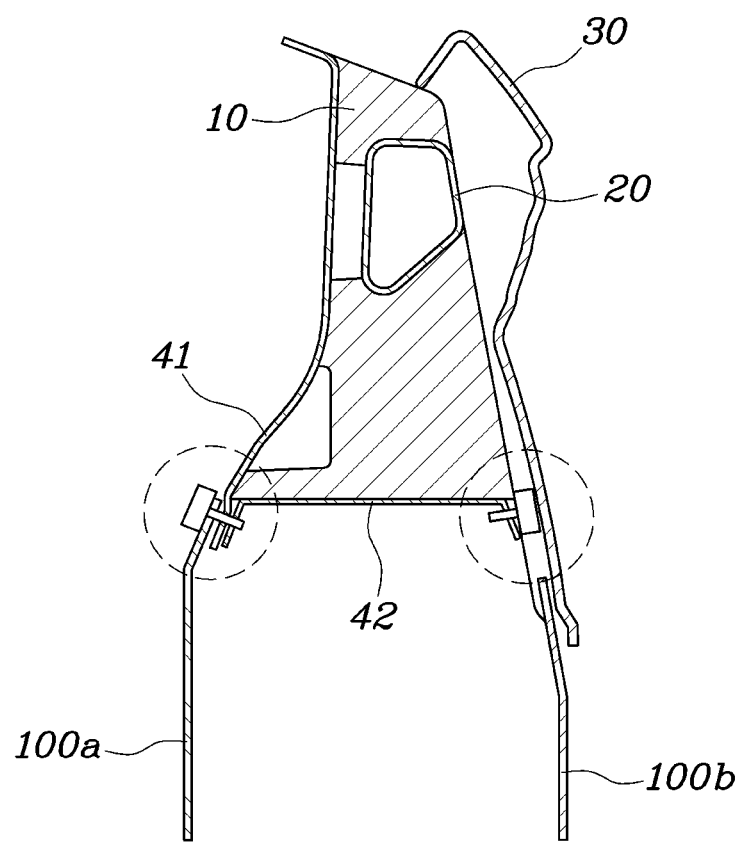
FIGS. 5A and 5B are sectional views showing two examples taken along line A-A in FIG. 4.
Figure 5B:
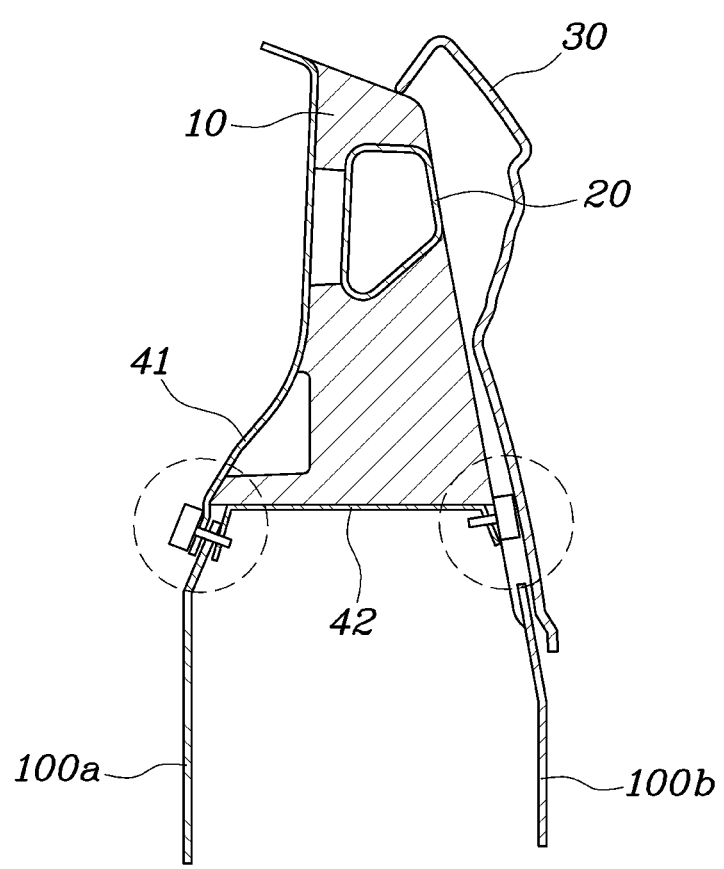
Figure 6:
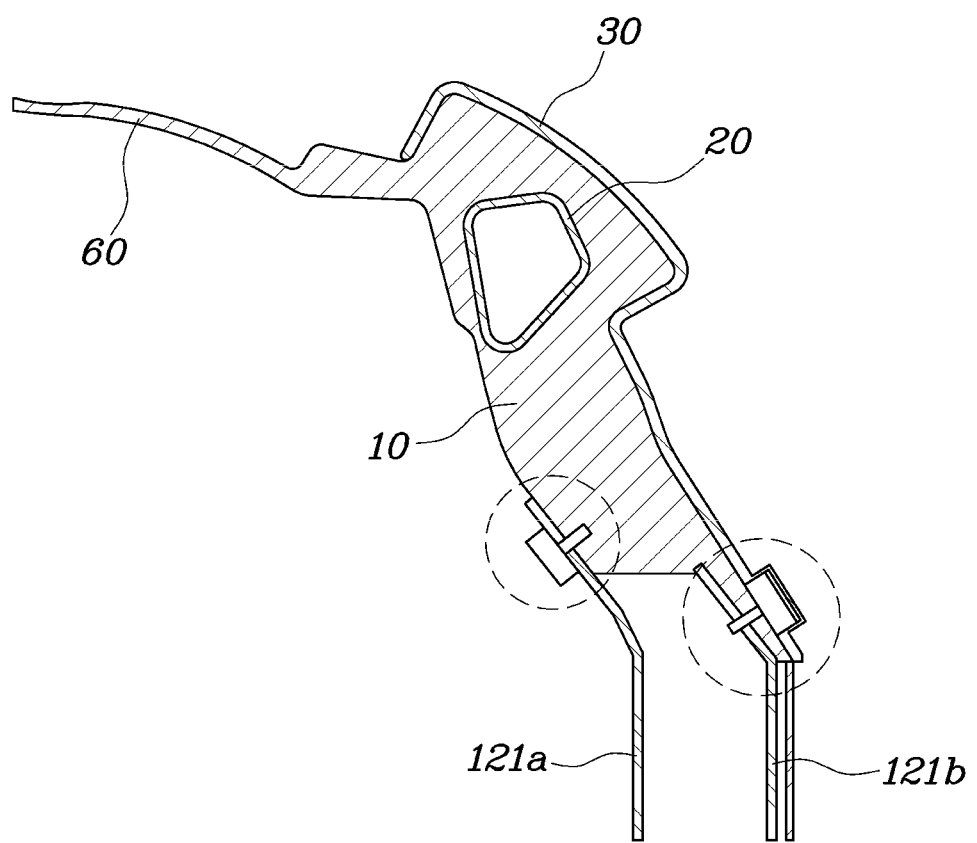
FIG. 6 is a sectional view taken along line B-B in FIG. 4.
Figure 7:
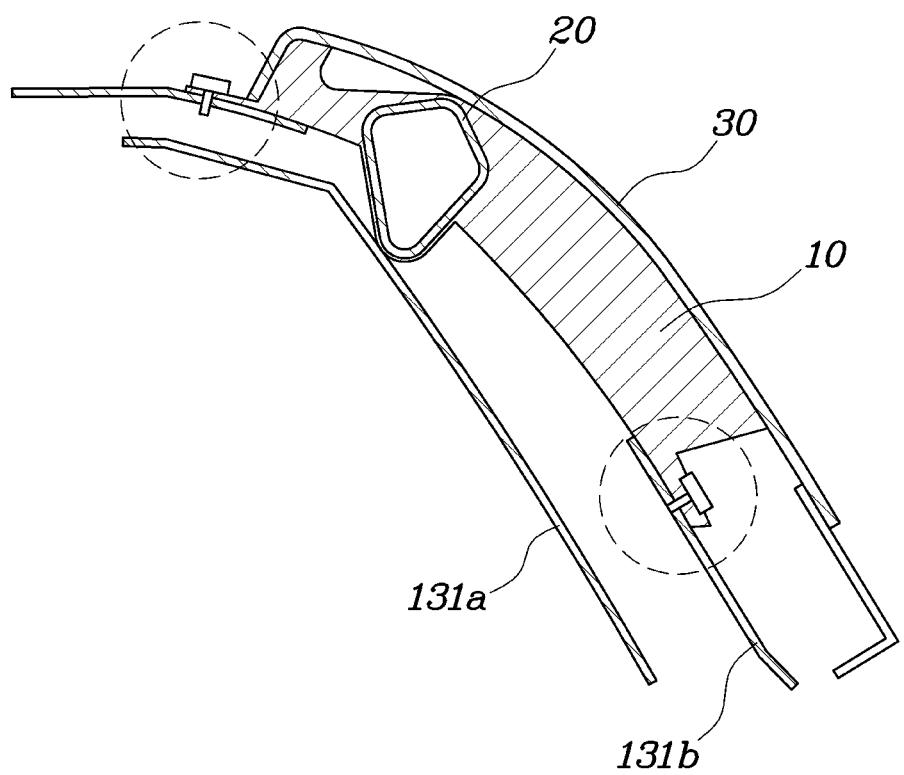
FIG. 7 is a sectional view taken along line C-C in FIG. 4.

FIG. 1 is an exploded-perspective view showing a base part 10, a tubular part 20, and an outer garnish 30 of a body for a vehicle according to an embodiment of the present invention. FIGS. 2 and 3 are perspective view showing a coupling embodiment of the body for a vehicle according to the embodiment of the present invention. FIG. 4 is a view showing a complete assembly of the body for a vehicle according to the embodiment of the present invention. FIGS. 5A and 5B are sectional views showing two examples taken along line A-A in FIG. 4. FIG. 6 is a sectional view taken along line B-B in FIG. 4. FIG. 7 is a sectional view taken along line C-C in FIG. 4.

Referring to FIGS. 1 to 4, the body for a vehicle according to an exemplary embodiment of the present invention will be described.

Conventionally, a monocoque body in which a vehicle body is integrally formed or a frame body in which an upper portion of a vehicle body is coupled to a lower portion after manufacturing the lower portion of the vehicle body has been manufactured.

However, recently, as the number of vehicle types sharing a lower portion platform of the vehicle body is increased, a manufacturing cost is increased in manufacturing the monocoque body.

In order to solve the above problem, in embodiments of the present invention, a lower portion body of a vehicle is manufactured in a monocoque body method and an upper body is then manufactured corresponding to the vehicle so that the body for a vehicle may be applied to various types of vehicles.

According to embodiments of the present invention, the body for a vehicle includes the base part 10 extended in a longitudinal direction of the vehicle and integrally connecting an A pillar to a roof side portion, and made of a plastic material and in which an inside portion is shaped in a rib 13, the tubular part 20 shaped in a steel pipe and extended in a length of a pillar part, and inserted into the base part 10 in manufacturing the base part 10, and the outer garnish 30 shaped in the longitudinal direction along the base part 10, and coupled to the base part 10 to cover the base part 10 and to constitute the exterior of the vehicle, and made of a plastic material.

As shown in FIG. 1, an upper portion of the body for a vehicle according to embodiments of the present invention may include the base part 10, the tubular part 20, and the outer garnish 30.

The base part 10 may be extended rearward from the A pillar of the vehicle along a side surface of the roof of the vehicle to form an upper side surface of the vehicle. The base part 10 is manufactured by plastic injection molding, and the inside portion thereof may be shaped in the rib 13.

As the base part 10 is manufactured of a synthetic resin material such as plastic, the base part 10 is formed in various shapes. When a plurality of vehicles sharing a lower portion of a vehicle is manufactured, vehicles may be manufactured in various shapes and there is a cost reduction effect. Furthermore, as the inside portion of the base part 10 is shaped in the rib 13, the weight thereof is reduced and stiffness may be increased.

The tubular part 20 is formed by extrusion molding using a steel material, and the base part 10 may be manufactured using a synthetic resin material by injection molding after insertion of the tubular part 20.

A flange portion 14 may be provided at an outer portion of the base part 10. The flange portion 14 is extended in the longitudinal direction and protrudes outward and is coupled to a weatherstrip or a sash 16 including a window of the vehicle.

The base part 10 is manufactured by injection molding, and the degree of freedom of the shape thereof is increased. Thus, the flange portion 14 may be provided to be extended outward from the base part 10. The roof, a wind glass, or a door of the vehicle may be mounted to the flange portion 14. Furthermore, the base part 10 is manufactured by injection molding, and a seating space into which an indoor component such as an airbag may be seated may be provided in the interior of the vehicle.

Figure 8:
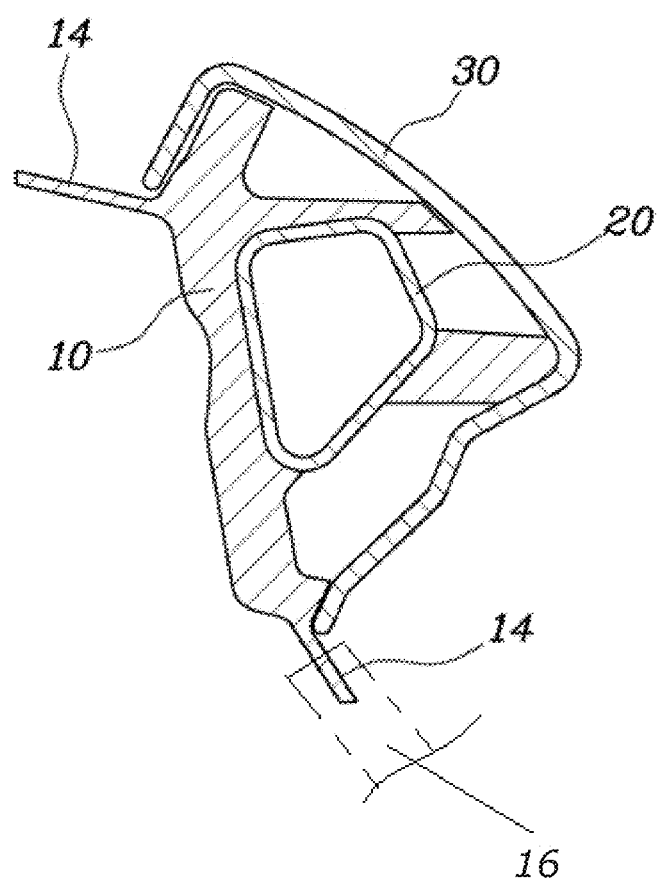
FIG. 8 is a sectional view taken along line D-D in FIG. 4.

As shown in FIG. 8, the tubular part 20 is manufactured by extrusion molding into a tubular shape from a metal material. After extrusion molding in the tubular shape, the tubular part 20 is molded in an extended direction of the base part 10, and the tubular part 20 is inserted into the base part 10 in the manufacturing process before extrusion molding of the base part 10, and after insertion of the tubular part 20, thus the base part 10 may be manufactured by extrusion molding on the tubular part 20.

Therefore, lack of rigidity of the base part 10 made of plastic may be reinforced with the tubular part 20, thereby improving the rigidity of the vehicle.

After the insertion of the tubular part 20, when the base part 10 is manufactured by injection molding, the outer garnish 30 may be coupled to the outer portion of the base part 10 so as to cover the shape of the rib 13 in the base part 10.

After the insertion of the tubular part 20 into the base part 10, the tubular part 20 may reinforce a coupling force between metal and plastic by an adhesive or laser structuring.

By the above process, the exterior of the vehicle may be generated and the rigidity thereof is additionally reinforced.

The outer garnish 30 may be molded of a metal material such as aluminum or made of a synthetic resin such as plastic.

The body for a vehicle includes a base frame 100 made of the metal material and including a front portion 110, a rear portion 120, and a lower portion 130 of the body connecting the front portion 110 to the rear portion 120. The base part 10 may be connected at a front end thereof to the front portion 110 and at a rear end thereof to the rear portion 120.

As shown in FIGS. 2 to 4, as the lower portion 130 coupled to an upper portion of the body for a vehicle, the base frame 100 in which the lower portion 130, the front portion 110, and the rear portion 120 of the vehicle are integrally manufactured may be formed. The base frame 100 may be formed in an integral body as the monocoque body shape, or the lower portion 130 is manufactured first as the frame body and then both the front portion 110 and the rear portion 120 may be additionally coupled to the lower portion 130. The base part 10 and the outer garnish 30 in which the tubular part 20 is inserted may be coupled in various shapes to an upper portion of the base frame 100.

Therefore, in manufacturing various vehicles sharing the lower portion 130 and differing at each upper portion, the manufacturing cost can be reduced.

Figure 11A:
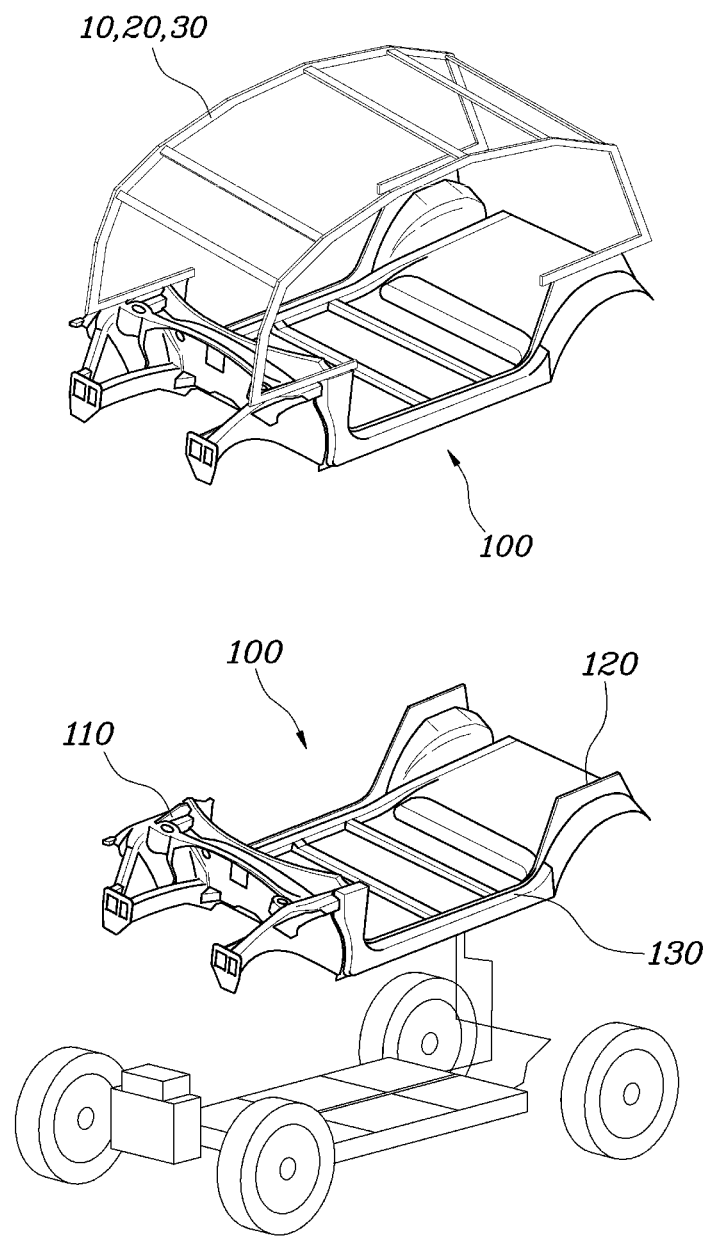
FIGS. 11A, 11B, and 11C are views showing various examples of the body for a vehicle according to an embodiment of the present invention.
Figure 11B:
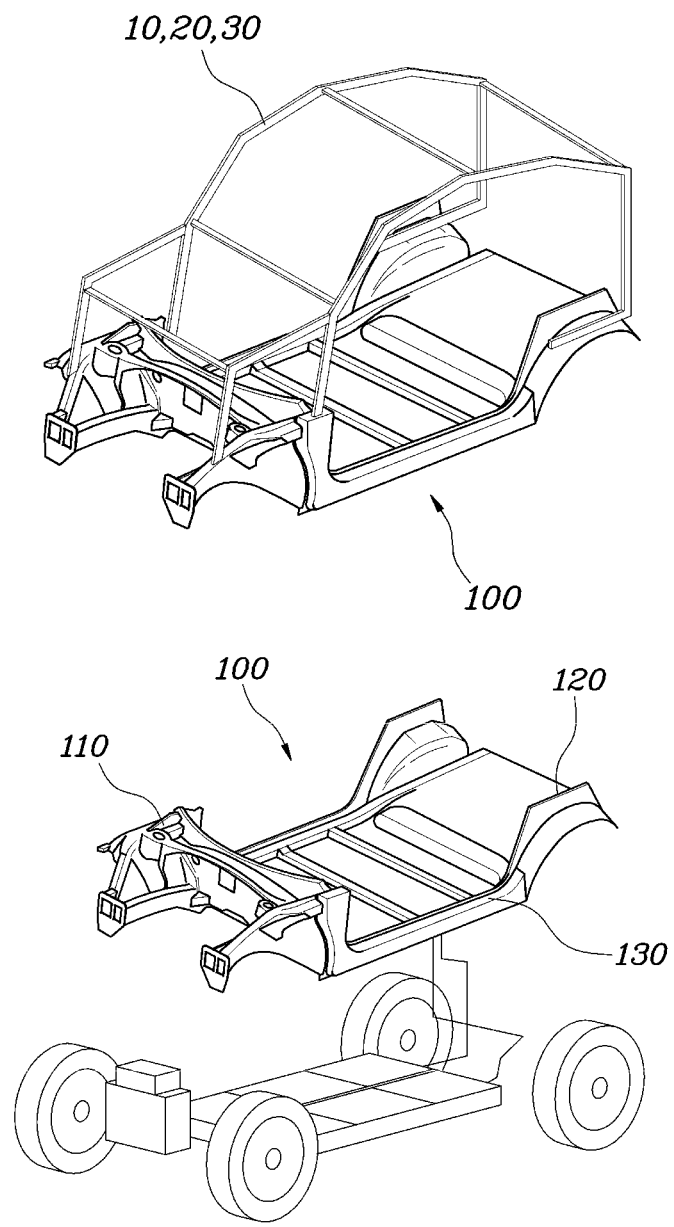
Figure 11C:
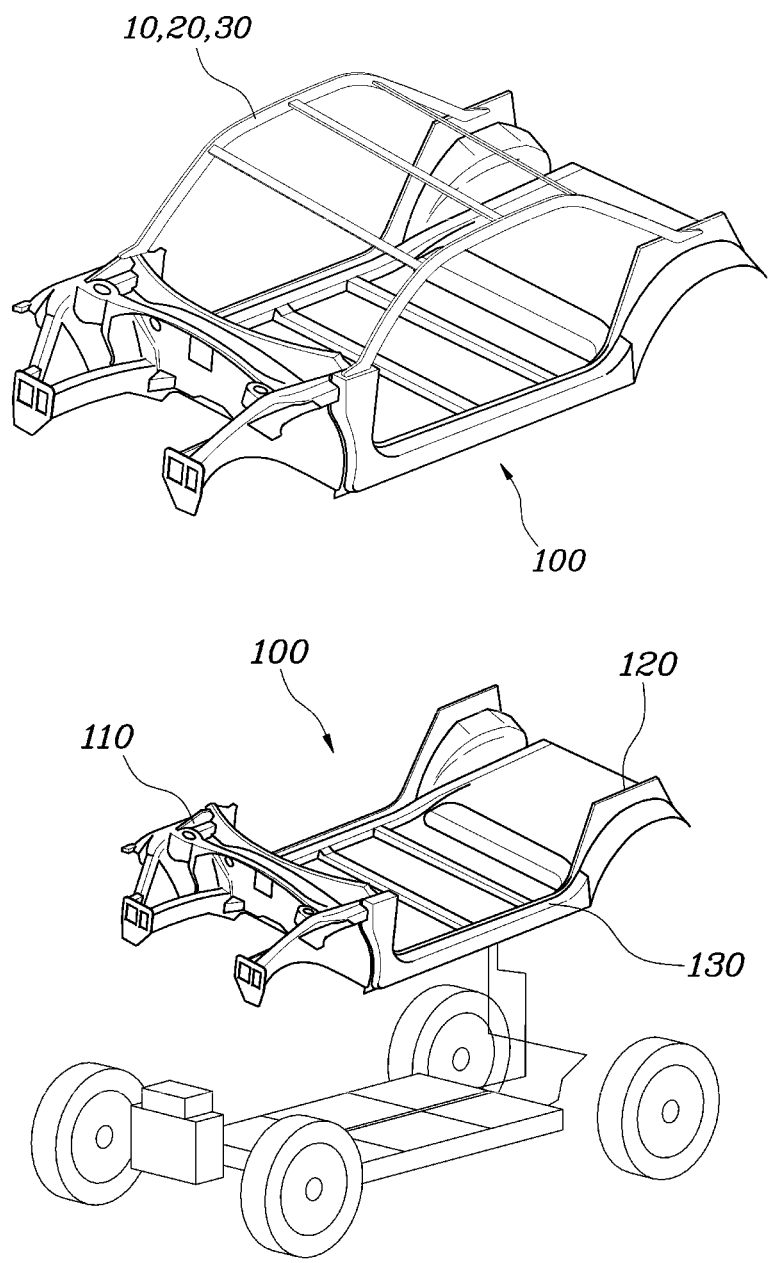

FIGS. 11A, 11B, and 11C are views showing various examples of the body for a vehicle according to an embodiment of the present invention.

As shown in FIGS. 11A, 11B, and 11C, the base frame 100 constitutes the lower portion of the vehicle, and according to embodiments of the present invention, the base part 10 and the tubular part 20 may form a side surface of the pillar part and the roof part of the base frame 100.

As shown in FIGS. 11A, 11B, and 11C, the base part 10 and the tubular part 20 that are shaped variously and coupled to the base frame may be formed in various types of vehicles in response to customer requirements even in the equivalent base frame 100.

The body for a vehicle according to embodiments of the present invention may be applied to a purpose-built vehicle (PBV), and in the PBV, it is necessary to develop a vehicle suitable for the market of small-volume, multi-variety production.

The PBV is considered in terms of flexibility, design freedom, reduction in the number of components, assembly in a smart factory, weight reduction, cost reduction, space utilization and performance in response to customer requirements. In order to meet the above considerations, the tubular part 20 is provided as a frame in the base frame 100 disclosed in embodiments of the present invention and the base part 10 formed by injection molding is coupled to an outer portion of the tubular part 20, so that the above-described considerations may be advantageous in a method of manufacturing various types of vehicle models in comparison to a conventional monocoque body method.

According to embodiments of the present invention, the base part 10 may be coupled to both the front portion and the rear portion of the base frame 100, and the front portion and the rear portion may have the shapes changed variously.

According to embodiments of the present invention, a C pillar extended from the rear portion is formed and is connected to the base part, and the C pillar may be shaped variously.

The PBV may be applied to an electric vehicle platform, and a battery, a motor wheel, and a suspension, which are devices in the drive system, are provided in the lower portion, and the base frame 100 may be coupled to an upper portion of the drive system, thereby constituting the body for a vehicle.

The body for a vehicle may include an inner bracket 41 coupled to inner portions of the base part 10 and the tubular part 20 and connecting both the base part 10 and the tubular part 20 to the front portion 110, and an outer bracket 42 coupled to outer portions of the base part 10 and the tubular part 20 and connecting both the base part 10 and the tubular part 20 to the front portion 110.

As shown in FIG. 1, the front end of the base part 10 may be coupled to the front portion 110 of the base part 10. In order to improve rigidity and convenience of coupling between the front end of the base part 10 and the front portion 110, the inner bracket 41 may be coupled to an inner portion of the front end of the base part 10 and the outer bracket may be coupled to an outer portion of the front end of the base part 10.

Therefore, when the shape of the front portion 110 is changed, the base part 10 may be coupled to the front portion 110 as the inner bracket 41 and the outer bracket 42 are deformed little, and the inner bracket 41 and the outer bracket 42 may be deformed in response to a coupling direction of the base part 10.

Therefore, the manufacturing cost can be reduced when embodiments of the present invention are applied to various vehicles, and convenience of coupling work can be improved.

The inner bracket 41 is coupled to an outer portion of an inner plate 110a of the front portion 110, and the outer bracket 42 may be coupled to an inner portion of an outer plate 110b of the front portion 110.

As shown in FIG. 2, in order to couple the base part 10 to the base frame 100 in a transverse direction of the vehicle, the inner bracket 41 may be coupled to the outer portion of the inner plate 110a of the front portion 110 of the base frame 100. As shown in FIG. 5A, the length of the inner plate 110a of the front portion 110 may be preset longer than the length of the outer plate 110b and thus both the inner bracket 41 and the outer bracket 42 may be coupled to the base frame 100 in the transverse direction from the base frame 100 while being coupled to a base panel.

Accordingly, on a product line, the base part 10 may be conveniently coupled to the base frame 100 in the transverse direction.

The rear portion 120 of the base frame 100 has a C pillar 121 extended toward the roof, and the lower portion 130 has a B pillar 131 extended toward the roof. The rear end of the base part 10 may be connected to the C pillar 121 and a middle portion of the base part 10 may be connected to the B pillar 131.

FIG. 6 is a sectional view of a connection portion of the B pillar 131. As shown in FIG. 6, embodiments of the present invention may be applied to both a coupling method of the base frame 100 in the transverse direction and a coupling method thereof in a downward direction, and therefore the base part 10 is connected to the B pillar 131 to be coupled to the B pillar 131.

As shown in FIG. 6, an inner portion of a lower end of the base part 10 is connected to an outer portion of an inner plate 121a of the B pillar.

An end of the B pillar 131 is formed to be inclined inward from the vehicle to be connected to both the base part 10 and the B pillar connection portion 11.

As shown in FIG. 6, an outer plate 121b and the inner plate ma of the B pillar are formed to be inclined inward from the vehicle, so that ends of the inner plate 121a and the outer plate 121b of the B pillar may be formed to have different heights from each other and the B pillar connection portion 11 may be coupled to the B pillar 131.

Therefore, the body for a vehicle can be applied to either the coupling method of the base part 10 in the transverse direction or the coupling method thereof in the downward direction.

Embodiments of the present invention include a C pillar bracket 50 connecting the base part 10 to the C pillar 121. The base part 10 is coupled to the C pillar bracket 50 to be connected to an outer plate of the C pillar and the outer garnish 30 may be connected to a lower end of the outer plate of the C pillar 121.

As shown in FIG. 7, a rear end of the base part 10 may be connected to the C pillar 121 extended forward from the rear portion 120 of the base frame 100. The C pillar bracket 50 provided for connection of the C pillar 121 is connected to the base frame 100 and the C pillar bracket 50 may be connected to the outer plate of the C pillar 121 to connect the base part 10 to the base frame 100.

For each type of vehicle, the shape of the C pillar 121 may be deformed or the shape of the base part 10 may be deformed, and the shape of the C pillar bracket 50 is deformed to connect the C pillar 121 to the base part 10 to improve the convenience of the manufacturing process.

The base part 10 may be coupled to the base frame 100 by mechanical coupling.

As shown in FIGS. 5 to 7, the brackets may be made of plastic or metal, and it is difficult to couple the brackets or the base part 10 to the metal base frame 100 only by welding, and the coupling may be achieved by the mechanical coupling such as bolting or riveting.

Therefore, the base part 10 and the base frame 100 can be solidly fixed.

Figure 9:
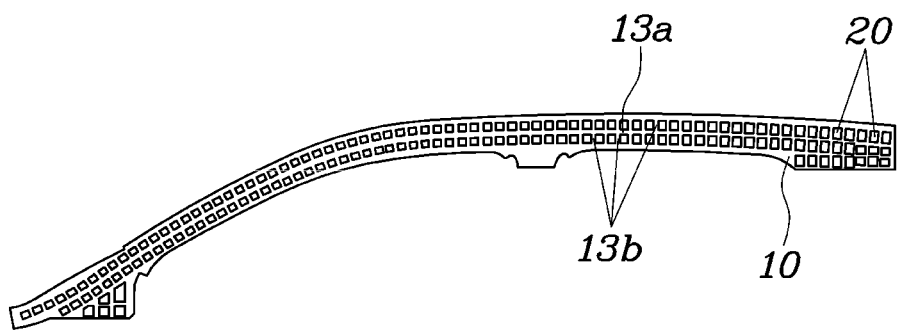
FIGS. 9 and 10 are views showing an example of a rib included in the base part of the body for a vehicle according to an embodiment of the present invention.
Figure 10:
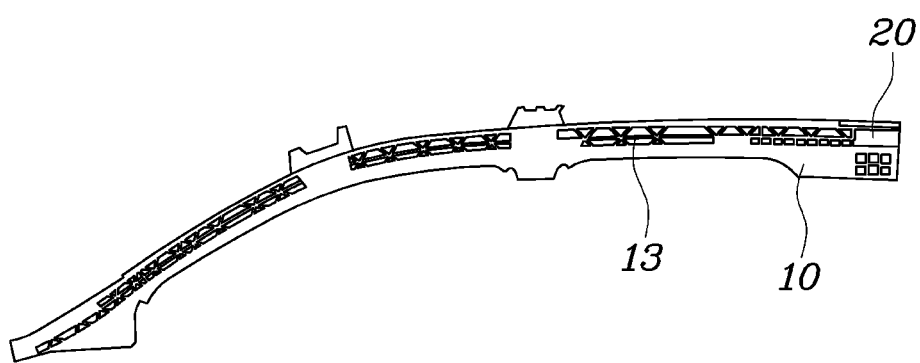

FIGS. 9 and 10 are views showing an example of the rib 13 included in the base part 10 of the body for a vehicle according to an embodiment of the present invention.

The rib 13 of the base part 10 may be arranged inside the base part 10 with an X-crossed shape.

Alternatively or additionally, the rib 13 of the base part 10 may have a shape of "H", "T", or "-".

As shown in FIG. 9, a plurality of ribs 13 provided inside the base part 10 is formed in a crossed direction at an outer surface of the base part 10 so that the plurality of ribs 13 may be arranged in the X-shape.

Therefore, there is an effect of bracing even in an impact applied from the outer surface of the base part 10.

The plurality of ribs 13 of the base part 10 may include a central rib 13a extended in an extended direction of the tubular part 20 and an auxiliary rib 13b extended in a direction intersecting the central rib 13a.

As shown in FIG. 10, the plurality of ribs 13 provided inside the base part 10 may be formed in the Ezion-Geber structure referring to the human spine structure shaped of the central rib 13a extended in the longitudinal direction of the tubular part 20 inserted in the base part 10 and the auxiliary rib 13b perpendicularly extended from the central rib 13a. Therefore, the rigidity of the base part 10 can be improved.

Pairs of base parts 10, tubular parts 20, and outer garnishes 30 are provided at transversally opposite portions of the vehicle, and a roof member 70 may be provided to be connected from each of the base parts 10 toward the roof.

The pair of the base parts 10 may be provided to be coupled to opposite side portions of the vehicle, and the roof member 70 is provided to connect the pair of the base parts 10 to each other above upper portions of the base parts 10 to support the upper portions of the base parts 10, so that the rigidity of the body for a vehicle can be improved.

A roof panel (not shown) or a sun roof (not shown) may be mounted to an upper portion of the roof member 70, and the roof member may support the roof panel (not shown) or the sun roof (not shown).

The inner bracket 41 is coupled to an inner portion of an inner plate 110a of the front portion 110, and the outer bracket 42 may be coupled to the inner portion of the outer plate 110b of the front portion 110.

As shown in FIG. 3, in order to couple the base part 10 to the base frame 100 in the downward direction of the vehicle, the inner bracket 41 may be coupled to the inner portion of the inner plate 110a of the front portion 110 of the base frame 100. As shown in FIG. 5B, the length of the inner plate 110a of the front portion 110 may be preset longer than the length of the outer plate 110b and the distance between the outer plate 110b and the inner plate 110a is formed shorter than the distance between the inner bracket 41 and the outer bracket 42. Therefore, both the inner bracket 41 and the outer bracket 42 may be coupled to the base frame 100 in the downward direction while being coupled to the base panel.

Therefore, all of the base part 10 to the roof member 70 are assembled in a modular shape at an external site, and on the main production line, the base part 10 is coupled to the base frame 100 in the downward direction, so that the manufacturing process can be simplified.

The base part 10 includes a roof connection portion 12 extended toward the roof to connect the roof to the roof member 70, and embodiments of the present invention may include a roof bracket 60 connecting the roof connection portion 12 to the roof member 70.

As shown in FIG. 1, the roof member 70 may be provided to connect the pair of base parts 10 to each other and the roof bracket 60 may be provided to connect the roof member 70 to the base part 10.

The roof bracket 60 may be variously shaped in response to the shape of the base part 10 or the roof member 70. Therefore, as the body for a vehicle is applied to vehicles with different widths, the efficiency in manufacturing the various types of vehicles can be improved.

Although the preferred embodiments of the present invention have been disclosed for illustrative purposes, those skilled in the art will appreciate that various modifications, additions, and substitutions are possible, without departing from the spirit and scope of the present invention.

What is claimed is:

1. A vehicle body comprising:
    a tubular part extended in a longitudinal direction of a vehicle and having a hollow shape;
    a base part in which the tubular part is inserted, the base part integrally connecting an A pillar to a side portion of a roof, wherein the base part includes a flange portion at an outer portion thereof, the flange portion being extended in the longitudinal direction and protruding outward; and
    an outer garnish shaped to be extended in the longitudinal direction along the base part and coupled to the base part to cover the base part.

2. The vehicle body of claim 1, further comprising a base frame comprising a metal material and including a front portion, a rear portion, and a lower portion, the lower portion connecting the front portion to the rear portion, wherein a front end of the base part is connected to the front portion of the base frame and a rear end of the base part is connected to the rear portion of the base frame.

3. The vehicle body of claim 2, further comprising:
    an inner bracket coupled to an inner portion of the base part and connecting the base part to the front portion; and
    an outer bracket coupled to the outer portion of the base part and connecting both the base part and the tubular part to the front portion.

4. The vehicle body of claim 3, wherein the inner bracket is coupled to an outer portion of an inner plate of the front portion and the outer bracket is coupled to both the inner bracket and an inner portion of an outer plate of the front portion.

5. The vehicle body of claim 3, wherein the inner bracket is coupled to an inner portion of an inner plate of the front portion and the outer bracket is coupled to an inner portion of an outer plate of the front portion.

6. The vehicle body of claim 2, wherein:
    the rear portion of the base frame comprises a C pillar extended toward the roof;
    the lower portion of the base frame comprises a B pillar extended toward the roof;
    the rear end of the base part is connected to the C pillar; and
    a middle portion of the base part is connected to the B pillar.

7. The vehicle body of claim 6, wherein an end of the B pillar is shaped to be inclined inward from the vehicle and is connected to both the base part and a B pillar connection portion.

8. The vehicle body of claim 6, further comprising a C pillar bracket connecting the base part to the C pillar, wherein the base part is coupled to the C pillar bracket to be connected to an outer plate of the C pillar, and the outer garnish is connected to a lower end of the outer plate of the C pillar.

9. The vehicle body of claim 1, wherein:
    the tubular part is extrusion molded using a steel material; and
    the base part is injection molded after the tubular part is inserted into the base part, the base part comprising a synthetic resin material.

10. The vehicle body of claim 1, wherein the flange portion is coupled to a weatherstrip or a sash including a window of the vehicle.

11. The vehicle body of claim 1, wherein the outer garnish comprises a plastic material and defines a portion of an exterior of the vehicle.

12. A vehicle body comprising:
    a tubular part extended in a longitudinal direction of a vehicle and having a hollow shape;
    a base part in which the tubular part is inserted, the base part integrally connecting an A pillar to a side portion of a roof, wherein an inner portion of the base part is shaped in a rib and wherein the base part includes a flange portion at an outer portion thereof, the flange portion being extended in the longitudinal direction and protruding outward; and
    an outer garnish shaped to be extended in the longitudinal direction along the base part and coupled to the base part to cover the base part.

13. The vehicle body of claim 12, wherein the rib of the base part has an X-crossed shape and is arranged inside the base part.

14. The vehicle body of claim 12, wherein the rib of the base part comprises a central rib extended in an extended direction of the tubular part and an auxiliary rib extended in a crossed direction to the central rib.

15. The vehicle body of claim 12, wherein the flange portion is coupled to a weatherstrip or a sash including a window of the vehicle.

16. The vehicle body of claim 12, wherein the outer garnish comprises a plastic material and defines a portion of an exterior of the vehicle.

17. A vehicle body comprising:

a pair of tubular parts extended in a longitudinal direction of a vehicle and having a hollow shape;

a pair of base parts into which the pair of tubular parts is inserted, each of the pair of base parts integrally connecting respective A pillars to respective side portions of a roof;

a pair of outer garnishes shaped to be extended in the longitudinal direction along the pair of base parts and coupled to the pair of base parts to cover the base parts, respectively; and a roof member extended from each of the pair of base parts toward the roof; and wherein the pair of base parts, the pair of tubular parts, and the pair of outer garnishes are provided at transversal opposite portions of the vehicle; and wherein the base parts each includes a flange portion at an outer portion thereof, the flange portion being extended in the longitudinal direction and protruding outward.

18. The vehicle body of claim 17, wherein each of pair of base parts comprises a roof connection portion extended toward the roof and connecting the respective base part to the roof member.

19. The vehicle body of claim 18, further comprising a roof bracket connecting the roof connection portion to the roof member.

20. The vehicle body of claim 2, further comprising an inner bracket coupled to an inner portion of the base part and connecting the base part to the front portion.

* * * * *